United States Patent Office

3,526,518
Patented Sept. 1, 1970

3,526,518
CONTROL OF APPLE STORAGE SCALD USING CERTAIN DIPHENYLAMINE COMPOSITIONS
Morton Kleiman, 2827 W. Catalpa Ave.,
Chicago, Ill. 60625
No Drawing. Filed July 12, 1967, Ser. No. 652,700
Int. Cl. A23b 7/14
U.S. Cl. 99—154        13 Claims

ABSTRACT OF THE DISCLOSURE

Treating apple storage scald with compositions comprising diphenylamine, emulsifier, and esters of aliphatic or alicyclic mono-, di-, or tri-hydric alcohols with mono-, di- or tri-basic aliphatic or alicyclic acids or mono- or dibasic aromatic acids.

---

This invention relates to new compositions of matter which are uniquely valuable for the treatment of apples that are to be held in cold storage and to a method of applying such compositions. More specifically, the new compositions of my invention are of great utility for application to apples prior to or shortly after placement thereof in cold storage, in order to prevent the development of storage scald on the fruit.

Storage scald is a physiological disorder which affects fruit after it has been in cold storage for some variable length of time. The cause of this disfunction remains unknown although it has been studied extensively for over forty years. Moreover, the occurrence of this physiological spoilage is not predictable, so that great economic losses can be sustained in some seasons unless the apples can be successfully treated to prevent its development. The most effective means of treating apples for scald prevention is the application thereto of the chemical diphenylamine. Heretofore, the latter has been applied to apples destined for cold storage in a finely particulate state of subdivision in water suspension, such suspensions being prepared by dispersing the finely milled chemical in water in the substantial absence of any auxiliary solvent. In one embodiment of this method, diphenylamine is finely milled with various diluents and adjuvants, and such mixture is added to the appropriate volume of water with agitation.

Although the use of such dispersions of diphenylamine in water for apple scald prevention is attended with excellent results, it is frequently desirable to be able to handle the active chemical in the form of a concentrated liquid solution rather than as a powdered product or an aqueous dispersion. Personnel who handle materials in fruit storage plants may be subject to sensitivity to the dust which gets into the air when measuring or weighing a powder, and managers of such operations are concerned that too much active material is frequently lost in the handling of a dry, powdered product because of the dusting tendencies. Thus, there has been a need for a liquid form of diphenylamine-containing product suitable for dilution with water to make dispersions and emulsions which can be used for fruit treatment for storage scald prevention.

Prior to the present invention, efforts to make dispersions of diphenylamine in water with the air of a solvent have employed an ethyl alcohol or isopropyl alcohol solution of the chemical. The use of such solutions has not been satisfactory, however, for a number of reasons, among which is fruit injury which results from the effects of the solvents per se, as well as from the tendency of these solvents to cause formation of undesirably large, crystalline aggregates of diphenylamine when the solutions are added to water. Relatively large, crystalline aggregates of diphenylamine produce fruit injury, and thus render the use of these solvents unsuitable. Furthermore, relatively large volumes of ethyl alcohol or of isopropyl alcohol are required, and this factor alone makes their use unpleasant and rather hazardous, owing to their high volatility.

It is an object of the present invention to provide new, liquid compositions which produce diphenylamine-containing emulsions and dispersions in water when mixed therewith, which are eminently effective for scald-preventive treatment of apples. Such compositions, upon admixture with water, promote thorough wetting of the apple surface, and spread the internal, emulsified phase thereon to form a substantially invisible, diphenylamine-containing coating having scald-preventive properties. It is a further object of my invention to make available conveniently handled and economical solutions of diphenylamine in specially suited solvent systems, which solutions have the hereinbefore enumerated, desired capabilities for dispersion or emulsification in water and for fruit treatment for storage scald prevention. These and other objects and advantages of my invention will become apparent to those skilled in the art from the following description thereof.

While as a general rule the concentrate compositions of the present invention will most advantageously be in the form of relatively free-flowing liquids at room temperatures, said concentrate compositions may, in certain instances, be in the form of solid solutions which will disperse upon addition to and admixture with water.

One of the distinct and noteworthy advantages of the compositions of the present invention is the ability and the proclivity of the dilute, aqueous emulsions prepared therefrom to spread the internal, disperse phase over the surface of the fruit being treated and to deposit thereon an extremely thin, substantially invisible, diphenylamine-containing film, which is both scald-protective for apples placed in cold storage, and which at the same time avoids disturbing or altering the normal appearance of the fruit surface. When applications of diphenylamine are made to apples from dilute, aqueous, substantially organic solvent-free dispersions prepared from finely milled diphenylamine compositions, there often remains upon the surface of the fruit a visible deposit, powder-like in appearance and whitish or grayish-white in color, which residue is not always desirable in the eyes of consumers. By treating apples with dilute, aqueous emulsions prepared from the compositions of the present invention rather than from finely milled diphenylamine compositions, the formation of such visible residues is avoided. In addition, the tendency toward spreading of the internal, diphenylamine-containing, dispersed phase enhances the even application of the protective film and the draining of the excess liquid from the surface of the fruit, increasing thereby the efficiency of the operation.

I have discovered that unusually and extremely useful emulsifiable and dispersible solutions of diphenylamine can be prepared by the use conjointly of surfactants or emulsifiers and of esters of aliphatic or alicyclic mono-, di-, and trihydric alcohols with (a) mono-, di-, and tribasic aliphatic and alicyclic acids, including hydroxy-, alkoxy-, keto-, and acyloxy-acids, and with (b) mono- and di-basic aromatic acids. Such esters should be of relatively low human toxicity or substantially non-toxic, and they must also form a solution in admixture with the diphenylamine and surfactants or emulsifiers to be used in the formulation. The terms surfactant and emulsifier are used interchangeably hereinafter to designate any materials which modify and affect the surface and interfacial properties of substances, which classes of compounds are generally well known to those skilled in the art.

In choosing esters for the practice of my invention, it is particularly desirable to use those having a relatively higher boiling range over those having the lower boiling ranges in order to minimize odor and the tendency toward rapid evaporation from the solution. Thus, in the series of the unsubstituted, monohydric, aliphatic and alicyclic alcohol esters of monobasic acids, I prefer to use those members of the series having, in general, a molecular weight of at least 140, such materials possessing lower volatility and less odor. When substituents are present, such as hydroxy-, alkoxy-, keto-, or acyloxy-groups, in either the alcohol or the acid portion of the ester molecule or in both, the volatility and the odor are generally considerably diminished over those of the unsubstituted counterparts, and, in such instances, these materials are preferred when they are also commonly and economically available. Similar considerations apply to the choice of preferred esters of di- and trihydric alcohols and of di- and tribasic acids, which, in common with the substituted esters noted above, also generally possess much lower volatility and odor.

In addition, the esters useful in the practice of my invention should preferably contain at least six carbon atoms and have a boiling point of at least 100° C. Either portion of the ester moiety, i.e., the alcohol fragment or the acid fragment, may be straight chain or cyclic, saturated or unsaturated, substituted or unsubstituted. An especially advantageous class of esters useful in the practice of my invention are those which contain not less than eight carbon atoms, which have a molecular weight of at least 170, and which have also a boiling point at atmospheric pressure of at least 170° C. Still another particularly advantageous class of esters useful in the practice of my invention comprises the esters of dihydric alcohols, viz., of glycols and of polyglycols, esterified with monobasic fatty acids, including saturated, unsaturated, and substituted fatty acids.

Some examples of the esters which may be used in the practice of my invention include but are not limited to the following: octyl acetate, hexyl butyrate, ethyl isovalerate, butyl lactate, butyl butyryl lactate, hexyl acetyl lactate, 2-methylbutyl isovalerate, methyl heptanoate, methyl heptenoate, methyl isovalerate, methyl laurate, methyl octanoate, methyl nonanoate, methyl nonenoate, methyl myristate, methyl decanoate, ethyl butyryl lactate, ethyl acetyl lactate, 2-ethylbutyl acetate, ethyl isobutyrate, ethyl isovalerate, ethyl hexanoate, ethyl heptanoate, ethyl caprylate, ethyl levulinate, ethyl nonanoate, ethyl decanoate, ethyl laurate, ethyl myristate, ethyl stearate, ethyl oleate, isopropyl butyrate, butyl ricinoleate, butyl acetyl-ricinoleate, isopropyl hexanoate, isopropyl caprylate, isopropyl myristate, butyl hexanoate, butyl myristate, butyl oleate, isobutyl palmitate, butyl butyrate, butyl stearate, amyl hexanoate, amyl heptanoate, amyl octanoate, isoamyl acetoacetate, isoamyl laurate, isoamyl pyruvate, 3-hexenyl isovalerate, 3-cyclohexenyl butyrate, hexyl butyrate, hexyl hexanoate, heptyl octanoate, diethyl succinate, dibutyl succinate, di-isobutyl malonate, dimethyl malonate, dimethyl succinate, dimethyl adipate, diethyl adipate, dibutyl adipate, dihexyl adipate, dioctyl adipate, diethyl malate, dibutyl malate, dibutyl sebacate, diethyl sebacate, diethyl tartrate, dihexyl tartrate, dibutyl tartrate, propylene glycol dibutyrate, propylene glycol didecanoate, glycerol monooleate, glycerol dioleate, glycerol dilaurate, propylene glycol dioleate, propylene glycol mono-oleate, propylene glycol monolaurate, glycerol monocaproate, triethyl citrate, tributyl citrate, trilauryl citrate, triethyl acetylcitrate, tributyl acetylcitrate, glycerol tributyrate, glycerol triacetate, cyclohexyl isobutyrate, cyclohexyl octanoate, cyclohexyl laurate, isobutyl hexahydrobenzoate, di-isobutyl tetrahydrophthalate, cyclohexyl isovalerate, isobutyl hexahydrobenzoate, lauryl propionate, decyl propionate, butoxyethyl stearate, butoxyethyl oleate, butoxyethyl laurate, ethoxyethyl stearate, 1,4-butanediol dipropionate, 1,4-butenediol dipropionate, 1,4-butenediol dibutyrate, 1,6-hexanediol dibutyrate, dipropylene glycol dilaurate, naturally occurring triglycerides such as peanut oil, cottonseed oil, corn oil, and other such oils, ethyl benzoate, butyl benzoate, diethyl phthalate, dibutyl phthalate, dibutyl isophthalate, di-isooctyl terephthalate, dioctyl phthalate, di-methoxyethyl phthalate, dibutoxyethoxyethyl phthalate, 2-ethylhexyl benzoate, 2-ethylhexyl anisate, polyethylene glycol esters of mono-, di-, and tribasic acids, such as polyethylene glycol 200 monolaurate, triethylene glycol mono-oleate, polyethylene glycol 400 dilaurate, polyethylene glycol 600 mono-oleate, polyethylene glycol 600 di-oleate, polyethylene glycol 600 monocaprylate, polypropylene glycol 400 dilaurate, tri-methoxy-polyethylene glycol 350 citrate, polypropylene glycol 1025 dioleate, di-methoxypolyethylene glycol 550 succinate, and many others which would be too numerous to list fully, but which will at once become apparent to one skilled in the art.

The discovery that diphenylamine can be used in combination with esters such as those described herein to prevent apples from developing storage scald is unexpected, as it has been noted in past investigations that various esters are harmful to fruit "finish," i.e., to the smooth and ordinarily unblemished, normal condition of the fruit surface. Indeed, the hypothesis has been advanced that the development within the fruit of esters, such compounds being normally associated with a significant portion of the characteristic fruit flavor, is in some way responsible for the development of storage scald in fruit subjected to cold storage, and this hypothesis finds support in the experimental finding that the application of various esters to the skin of apples causes a browning and blistering of the skin surface which are characteristic of and virtually indistinguishable from the discoloration and injury that typify apple storage scald. Indeed, it has been noted that even as little as 5 parts per million concentration in air (in an apple cold storage room) of the vapor of esters isolated from apple volatiles can cause severe damage in 12 hours' exposure; and the application to the surface of apples of many esters as such causes virtually immediate injury. By contrast, when apples are treated with the dilute dispersions and emulsions prepared from the compositions of my invention at the normal usage concentrations, not only is the absence of severe injury to the fruit a striking departure from what would be expected, but the fruit is actually protected from scald injury.

In the practice of my invention, diphenylamine is combined with one or more esters of the classes defined above, and with any of a wide selection of one or more emulsifying agents, a combination of two or more of the latter generally being more desirable, it only being necessary that the materials chosen be compatible at ordinary temperatures and be present in sufficient amounts to form a solution which can be emulsified or dispersed in water. The number of esters and of emulsifiers which are selected to be combined to prepare a formulation within the scope of my invention is not critical, it being possible to use several such materials to good advantage in a large variety of possible combinations. Also, the order or manner of mixing, and the temperature of mixing are not important or critical, nor is it significant if in some instances relatively minor amounts of some insoluble material may separate to produce a turbidity or to give a precipitate in small proportion; minor amounts of such precipitate or turbidity can be readily removed in any suitable manner, as by settling and decantation, or by filtration, and do not constitute incompatibilty for the purposes of the practice of the invention.

In the preparation of the dilute, aqueous dispersions and emulsions from the concentrate compositions of the present invention, it is necessary only to provide a sufficient degree of mixing for a sufficient tiime to obtain the desired dispersion. Such mixing may be provided by turbulent flow in a section of pipe, or by addition of the concentrate to water at high velocity through the orifice, or by high-shear stirring, or by passing a mixture of concentrate solution and water through a colloid mill, or by mixing with a simple paddle mixer in a tank, or by any other convenient means suitable to the size and nature of the equipment and the characteristics of the concentrate solution. As will be evident to those skilled in the art, it is possible to make compositions within the scope and spirit of my invention which are capable of emulsification and dispersion in water under conditions varying from very slight agitation of short duration to conditions of vigorous, high-shear, and continuous agitation.

The compositions of my invention are generally added to water with agitation and mixing so as to produce an emulsion which contains a preferred concentration, by weight, of from about 0.1 to about 0.2 percent of diphenylamine. While these concentrations are not critical, it has been found that most varieties of apples can be beneficially treated for scald prevention within this range, although lower concentrations such as 0.05 and in some instances even 0.025 percent can be saisfactorily employed, and higher concentrations, e.g., 0.3, 0.4, and 0.5 percent may be used. Generally speaking, the fruit is treated by simply dipping it (in boxes or other containers) into the dilute emulsion), allowing the fruit to remain in contact with the liquid for a short time, the length of immersion time not being a critical factor, then removing the fruit and placing it in storage. Alternatively, the liquid emulsion may be sprayed onto the fruit while the latter is still on the tree, or it may be sprayed onto the already harvested fruit as the latter is moved down a roller sorter or a conveyor. Various alternative modes of application of the dilute emulsions prepared in accordance with my invention will be evident to operators skilled in the handling of apples and in the operation of storage houses. It will suffice to note that the manner of application is not a critical factor, it only being necessary to make certain that all of the fruit is adequately wet with the liquid and that the fruit is drained sufficiently after treatment to avoid its standing in an accumulaion of the treating liquid which has drained.

In practice, the emulsifiable concentrate solutions of my invention may contain, by weight, as little as about 5% diphenylamine, or as high as about 65 or 70% diphenylamine, although the preferred and especially useful concentrations will generally fall within the range of from about 15 to about 50% diphenylamine. Similarly, the useful range of ester concentration, by weight, will extend from as low a value as even 1% ester to as high a concentration as about 85%. It is preferred, however, to use concentrations which will take full advantage of the desirable properties contributed to such solutions by the esters and at the same time to avoid using excessive amounts so as to hold costs to economical limits. Thus, the preferred ester concentrations will usually fall within the range of from about 5 to about 75% of the composition.

The surfactants and emulsifiers which may be used in the practice of my invention can be any of quite a large number and variety of types, it being necessary only that the materials selected be mutually compatible and soluble when incorporated with an ester or mixture of esters and the diphenylamine. It is noteworthy that the new compositions of my invention disclosed herein, which are in the physical form of homogeneous solutions, frequently result from a combination of materials which otherwise are not miscible or compatible with each other. Some of the esters which are comprehended within the scope of my invention are in themselves surfactants and emulsifiers. Among the surfactants and emulsifiers which can be combined with other components in the practice of my invention the following may be mentioned for purposes of illustration, but it should be understood that it is not intended to limit hereby the selection of such materials to the types or individual examples listed:

(1) Polyethoxylated alkylphenols, e.g., polyethoxylated octylphenol, polyethoxylated nonylphenol, polyethoxylated dodecylphenol, and other such materials, available commercially under the trade names "Triton X–," "Tergitol NP–," "Tergitol 12P," "Igepal CA," "Igepal CO," "Sterox," "Ninox," "Hyonic PE," and others; the number of moles of ethylene oxide per mole of alkylphenol being variable within wide limits, but commonly being of the order of from about 3 moles of ethylene oxide per mole of alkylphenol to about 30;

(2) Sulfated, polyethoxylated alkylphenols and their salts, available commercially under the trade names "Triton," "Alipal," "Cellopal," "Neutronyx," "Sulfotex," and others;

(3) Polyethoxylated amines and amides, available commercially under the trade names "Amidox C," "Amidox L," "Emulphor V," "Ethofat," "Priminox," and others; the number of moles of ethylene oxide per mol amine or amide being variable within wide limits, but commonly being of the order of from about 3 to about 30 moles of ethylene oxide per mole of amine or amide;

(4) Long chain ($C_{12}$ and higher) fatty acid salts, e.g., oleic, palmitic, stearic, lauric acids, tall oil fatty acid salts of alkali metal and amines;

(5) Sorbitan esters of fatty acids, available commercially under the trade names "Armotan," "Emsorb," "Span," and many others;

(6) Polyethoxylated sorbitan esters of fatty acids, available commercially under the trade names of "Tween," "Armotan," "Emsorb," and many others; these last two particular classes of emulsifiers alone and in combination with each other constituting a common and frequently used type of emulsifier, favored particularly for food product applications;

(7) Polyethoxylated fatty acids and polyethoxylated fatty esters, available under the trade names "Surfactol," "Nonisol," "Emerest," "Emulphor El," "Lipal," and others;

(8) Polyethoxylated long-chain alcohols, commercially available under various trade names, such as "Alkanol," "Brij," "Emulphor ON," "Emulphogene BC," "Lipal," "Tergitol 3," and others;

(9) Sulfated, polyethoxylated, long-chain alcohols and their salts, commercially available under the trade names "Avirol," "Duponol," "Empicol," "Maprofix," "Sipon," and others;

(10) Alkyl aryl sulfonates, such as octyl-, nonyl-, dodecyl-, and tridecylbenzene sulfonic acids and salts thereof, available commercially under the trade names "Ahcowet," "Conco AAS," "Eccoterge ASB," "Ecconol 606," "Emcol," "Nacconol," "Ninate," "Orvus," "Petro," "Santomerse," "Siponate," and many others;

(11) Mono- and di-glycerides of fatty acids, available commercially under the trade names "Drewmulse," "Emcol," "Surfactol," "Arlacel," "Kessco," "Myverol," "Starfol," and others;

(12) N-Acylsarcosine derivatives and salts thereof, available commercially under the trade names "Rokosyl," "Sarkosyl," and others;

(13) Fatty acid alkylol amide condensates, commercially available under the trade names "Alrosol," "Emcol," "Empilan," "Hyonic," "Ninol," "Nopcogen," "Onyxol," "Permalene," and others;

(14) Organic phosphate ester derivatives, commercially available under the trade names "Alkapent," "Antara," "Crestol," "Phosphonol," "Tergitol," "Victamul," "Victawet," "QS Surfactants," and others; the number of moles of ethylene oxide per mole of compound in all of the above-listed polyethoxylated surfactants being variable within wide limits, but commonly being of the order of from about 3 to about 30 moles per mole.

The foregoing list of emulsifiers and surfactants is by no means complete or exhaustive, as there are indeed numerous such materials available to the art in addition to those named above, and the selection of a desired emulsifier or combination of emulsifiers allows considerable variations as to types, relative amounts of various components, and selected properties, such as foam characteristics, degree of water solubility, rate of dissolution in water or dispersion in water, wetting and spreading powers, effects on surface and interfacial tension, and others. It would not be practically feasible to name all of the materials which are available to the trade, many of which are duplicates under different trade names, as can be noted from the numerous examples cited above. Moreover, the numerous combinations possible within the scope of the present invention will be amply evident to one skilled in the art, it being possible to utilize these many various materials in conjunction with esters of the types hereinbefore specified and defined to prepare the novel and useful compositions of my invention.

Some examples of emulsifiable and dispersible solutions of diphenylamine which are typical embodiments of the invention, based upon the detailed, foregoing disclosure, and utilizing some of the typical materials disclosed are presented below for purposes of more fully illustrating the practice of the invention. All percentages given are by weight.

EXAMPLE 1

A 50% concentrate of diphenylamine was prepared from diphenylamine, 50 g.; ethyl hexanoate, 5 g.; and 45 g. of a mixture of 9% "Triton X-35" and 91% "Triton X-102."

A one liter batch of dilute, aqueous diphenylamine emulsion containing a concentration of 0.2% diphenylamine was prepared by diluting 4 g. of said 50% concentrate with water, agitating vigorously. Twenty freshly harvested Rhode Island Greening apples were sprayed with this emulsion until thoroughly wet to the point of run-off, and placed in storage at 0° to 1° C. and 90% relative humidity. For comparison, twenty freshly harvested apples of the same variety were sprayed with water only, and placed under the identical cold storage conditions. The apples were removed after 140 days, held at room temperature of 20° to 23° C. for seven days, and then were examined for scald incidence. The following results were observed:

|  | Percent scald | Percent scald control |
| --- | --- | --- |
| Test apples | 5 | 93 |
| Control apples | 70 | 0 |

The percent scald control is calculated in the following manner. Allow $x$ to represent the percent scald on the treated apples, $y$ to represent the percent scald on the control group of apples; then the percent scald control is expressed by the following formula:

$$\text{Percent scald control} = \frac{100(y-x)}{y}$$

The foregoing example illustrates the use of an unsubstituted aliphatic ester in the form of a monohydric alcohol esterified with an unsubstituted monobasic acid, in combination with diphenylamine and with surfactants of Class 1 hereinbefore described.

EXAMPLE 2

A 15% concentrate was prepared from diphenylamine, 15 g.; 2-ethylhexyl acetate, 35 g.; and 50 g. of a blend of 60% "Igepal CO-730" with 40% "Emulphor EL-719."

A ten liter batch of dilute, aqueous diphenylamine emulsion containing a concentration of 0.1% diphenylamine was prepared by adding with good stirring 66.7 g. of said 15% concentrate to water. The emulsion was stirred while dipping apples for treatment, the apples being held therein for approximately 20 to 30 seconds. Twenty five freshly harvested apples of the Baldwin variety were dipped in the emulsion, as described, and were then placed in cold storage under the conditions given above in Example 1. The apples were held in storage for 125 days. An equal number of apples of the same variety were dipped in water in the same manner, and placed under the identical storage conditions for the identical period of time. Upon removal from cold storage, the two groups of apples were held at room temperature of 20° to 23° C. for seven days, and were then examined for scald incidence. The following results were observed:

|  | Percent scald | Percent scald control |
| --- | --- | --- |
| Test apples | 8 | 90 |
| Control apples | 80 | 0 |

The foregoing example illustrates the use of another unsubstituted aliphatic ester in the form of a monohydric alcohol esterified with an unsubstituted aliphatic monobasic acid, and an ester of a polyglycol esterified with a monobasic fatty acid, in combination with diphenylamine and surfactants from the Classes 1 and 7 hereinbefore described.

EXAMPLE 3

A 30% concentrate was prepared from 30 g. diphenylamine, 30 g. cyclohexyl butyrate, and 40 g. of a mixture of 99.5% "Emulphogene BC-720" and 0.5% potassium oleate. The solution, after standing for 48 hours, deposited a slight flocculent precipitate, which was removed by decanting and filtration.

A fifteen liter batch of dilute, aqueous diphenylamine emulsion containing a concentration of 0.15% diphenylamine was prepared by dispersing 75 g. of said 30% concentrate in water. This emulsion was used for treating apples by dipping, as in the preceding example. Twenty five freshly harvested Rome Beauty apples were treated with this emulsion and placed in storage at 0° to 1° C. and 90% relative humidity. For comparison, twenty five freshly harvested Rome Beauty apples were dipped in fresh water in the identical manner and placed under the identical conditions of storage. Both groups of apples were removed after 150 days and were then held at room temperature of 20° to 23° C. for seven days. Upon examination of the apples for scald development, the following results were observed:

|  | Percent scald | Percent scald control |
| --- | --- | --- |
| Test apples | 8 | 91 |
| Control apples | 88 | 0 |

The foregoing example illustrates the use of an ester in the form of a monohydric, alicyclic alcohol esterified with an unsubstituted aliphatic fatty acid, in combination with diphenylamine and surfactants from the Classes 4 and 8 hereinbefore described.

EXAMPLE 4

A concentrate was prepared from diphenylamine, 55 g.; methoxyethyl butyrate, 10 g.; and 35 g. of a mixture comprising 20% "Span 20," 79.9% "Tween 20," and 0.1% morpholinium oleate.

Ten liters of dilute aqueous emulsion containing 0.3% diphenylamine was prepared by dispersing 54.6 g. of said concentrate in water. Twenty five freshly harvested apples of the variety Wealthy were treated with this emulsion by dipping them therein and agitating for 15 seconds; the apples were removed, drained briefly, and placed wet in cold storage at 1° to 2° C. and 90% relative humidity, along with twenty five apples for a control group, the latter having been dipped in like manner in fresh water only. After holding these apples for 170 days under these conditions, then removing them and placing them at ambient room temperatures of 20° to 22° C. for seven days, the two groups of apples were then rated for the incidence of storage scald. The following results were observed:

|  | Percent scald | Percent scald control |
|---|---|---|
| Test apples | 4 | 95 |
| Control apples | 80 | 0 |

The foregoing example illustrates the use of an ester in the form of an aliphatic, monohydric, alkoxy-substituted alcohol esterified with an aliphatic, monobasic acid, in combination with diphenylamine and surfactants from the Classes 4, 5, and 6 hereinbefore described.

EXAMPLE 5

A concentrate was prepared from diphenylamine, 30 g.; butoxyethoxyethyl isovalerate, 30 g.; and "Tergitol NP-35," 40 g.

Ten liters of dilute aqueous emulsion containing 0.05% diphenylamine was prepared by dispersing 16.7 g. of said concentrate in 10 liters of water. Twenty five freshly harvested apples of the variety Cortland were treated with this emulsion by dipping them therein and stirring for 45 seconds; the apples were removed; drained briefly, and placed wet in cold storage at 1° to 2° C. and 90% relative humidity. Another group of twenty five harvested apples of the same variety were dipped in like manner in water only, to serve as a control. Both groups of apples were held in the cold for a period of 170 days, at the end of which time they were removed and placed at room temperature of 20° to 23° C. for seven days. They were then rated for the incidence of storage scald, with the following results:

|  | Percent scald | Percent scald control |
|---|---|---|
| Test apples | 16 | 80 |
| Control apples | 80 | 0 |

The foregoing example illustrats the use of an ester in the form of an aliphatic, monohydric, alkoxy-substituted ether-alcohol esterified with an aliphatic monobasic acid, in combination with diphenylamine and surfactants from the Class 1 hereinbefore described.

EXAMPLE 6

A concentrate was prepared from diphenylamine, 30 g.; butyl lactate, 50 g.; and 120 g. of a mixture comprising 20% "Span 20," 79.9% "Tween 20," and 0.1% morpholinium oleate.

Ten liters of dilute aqueous emulsion containing 0.2% diphenylamine was prepared by dispersing 133 g. of concentrate prepared as above in 10 liters of water. Twenty five freshly harvested Rome Beauty apples were treated with this emulsion by dipping them therein with vigorous stirring for a period of 30 seconds; the apples were removed, drained briefly, and placed wet in cold storage at 0° to 2° C. and 90% relative humidity. Another group of twenty five freshly harvested Rome Beauty apples were dipped in like manner in water only, to serve as a control. After both groups of apples had been held in the cold for a period of 180 days, they were removed and placed at room temperature of 20° to 23° C. for seven days. They were then rated for the incidence of storage scald, with the following results:

|  | Percent scald | Percent scald control |
|---|---|---|
| Test apples | 4 | 94.5 |
| Control apples | 72 | 0 |

The foregoing example illustrates the use of an ester in the form of an aliphatic, monohydric alcohol esterified with an hydroxy-substituted, aliphatic, monobasic acid, in combination with diphenylamine and surfactants of Classes 4, 5, and 6 hereinbefore described.

EXAMPLE 7

A concentrate solution was prepared from diphenylamine, 10 g.; butyl butyryl lactate, 50 g.; and 40 g. of a blend comprising 60% "Igepal CO-730" with 40% "Emulphor EL-719."

Five liters of dilute, aqueous emulsion containing 0.2% diphenylamine was prepared by dispersing 100 g. of said concentrate in water. Twenty freshly harvested Rome Beauty apples were treated with this emulsion by dipping them therein with agitation for a period of 20 seconds; the apples were then removed, drained briefly, and placed wet in cold storage at 0° to 1° C. and 90% relative humidity. Another group of twenty freshly harvested Rome Beauty apples were dipped in identical manner in fresh water, to serve as a control. Both groups of apples were held in the cold for a period of 180 days, after which they were removed and placed at ambient room temperature conditions of 20° to 23° C. for seven days. The incidence of storage scald was then rated on the two groups of apples, with the following observations:

|  | Percent scald | Percent scald control |
|---|---|---|
| Test apples | 5 | 93 |
| Control apples | 70 | 0 |

The foregoing example illustrates the use of an ester in the form of an aliphatic, monohydric alcohol esterified with an acyloxy-substituted, aliphatic, monobasic acid, and of an ester in the form of a polyglycol esterified with a monobasic fatty acid, in combination with diphenylamine and surfactants of Classes 1 and 7 hereinbefore described.

EXAMPLE 8

A concentrate was prepared from diphenylamine, 35 g.; diethyl succinate, 25 g.; and 40 g. of a blend comprising 30% "Igepal CO-530" with 70% "Igepal CO-710."

Ten liters of dilute, aqueous emulsion containing 0.2% diphenylamine was prepared by dispersing 57.2 g. of said concentrate in water. Twenty five freshly harvested Rome Beauty apples were treated with this emulsion by spraying them as they were moved down a roller conveyor so that they were very thoroughly wet with the emulsion. A similar group of apples of the same variety were sprayed with water to serve as a control, and all the apples were immediately placed in cold storage at 0° to 1° C. and 90% relative humidity. Both groups of apples were held in the cold for a period of 180 days, after which they were removed and placed at ambient room temperature conditions of 20° to 23° C. for seven days. The two groups of apples were then rated for the number of apples on which storage scald had developed. The following observations were made:

|  | Percent scald | Percent scald control |
|---|---|---|
| Test apples | 8 | 90 |
| Control apples | 80 | 0 |

The foregoing example illustrates the use of an ester in the form of a monohydric aliphatic alcohol esterified with a saturated, aliphatic, dibasic acid, in combination with diphenylamine and surfactants from Classes 1 and 7 hereinbefore described.

EXAMPLE 9

A concentrate was prepared from diphenylamine, 20 g.; triethylene glycol diacetate, 35 g.; and 45 g. of a mixture of emulsifiers comprising 75% "Emulphogene BC-610" and 25% "Gafac RE-610."

Ten liters of dilute, aqueous emulsion containing 0.2% diphenylamine was prepared by dispersing 100 g. of said concentrate in ten liters of water. Twenty five freshly harvested apples of the variety Cortland were treated with this emulsion by dipping them therein with good agitation for a period of 30 to 45 seconds. The apples were removed, drained briefly, and placed wet in cold storage at 1° to 2° C. and 90% relative humidity. Another group of twenty five apples of the same variety and freshly harvested were dipped in like manner in water only to serve as a control. Both groups of apples were held in the cold for a period of 170 days, at the end of which time they were removed and placed at room temperature of 20° to 23° for seven days. They were then rated for the development of storage scald, with the following results:

|             | Percent scald | Percent scald control |
|-------------|---------------|----------------------|
| Test apples | 8             | 89.5                 |
| Control apples | 76         | 0                    |

The foregoing example illustrates the use of an ester in the form of a polyglycol (polyether dihydric aliphatic alcohol) esterified with a saturated, aliphatic, monobasic acid, in combination with diphenylamine and surfactants from the Classes 8 and 14 hereinbefore described.

EXAMPLE 10

A concentrate was prepared from diphenylamine, 30 g.; 1,6-hexylene glycol dipropionate, 40 g.; and 30 g. of a mixture of surfactants comprising 80% "Triton X-114" and 20% "Sarkosyl L."

Ten liters of dilute, aqueous emulsion containing 0.15% diphenylamine was prepared by dispersing 50 g. of said concentrate in ten liters of water. Twenty five freshly harvested Red Delicious apples were treated with this emulsion by dipping them therein, stirring well during the treatment, for a period of 30 seconds. The apples were removed, drained briefly, and placed wet in cold storage at 1° to 2° C. and 90% relative humidity. A like group of twenty five freshly harvested Red Delicious apples were dipped in the identical manner in plain water, to serve as a control. Both groups of apples were held in the cold for a period of 180 days, at the end of which time they were removed and placed at room temperature conditions of 20° to 23° C. for seven days. They were then rated for the development of storage scald, with the following results:

|             | Percent scald | Percent scald control |
|-------------|---------------|----------------------|
| Test apples | 0             | 100                  |
| Control apples | 52         | 0                    |

The foregoing example illustrates the use of an ester in the form of a saturated, aliphatic glycol esterified with a saturated, aliphatic, monobasic acid, in combination with diphenylamine and surfactants from the Classes 1 and 12 hereinbefore described.

The detailed disclosure of my invention and the description of the practice thereof in the many specific examples of suitable esters and surfactants and in the examples of a wide variety of diphenylamine concentrate solutions which may be made from combinations of the nature hereinbefore described now enable one skilled in the art to prepare many modifications and variations conforming to the breadth and spirit of the invention. All such variations and modifications are intended to be included within the scope of the claims.

I claim:

1. A liquid concentrate suitable for dispersion in an aqueous medium, useful for controlling apple storage scald, comprising a substantially homogeneous solution of from about 5% to about 70% diphenylamine, emulsifier, and from about 1% to about 85% ester selected from the group consisting of esters of aliphatic and alicyclic mono-, di-, and trihydric alcohols esterified with an acid selected from the group consisting of mono-, di-, and tribasic aliphatic and alicyclic acids, and mono- and dibasic aromatic acids.

2. An aqueous dispersion of the concentrate according to claim 1, containing from about 0.02% to about 0.5% diphenylamine.

3. A concentrate according to claim 1, in which the ester has a molecular weight of at least 140 and a boiling point of at least 100° C. at atmospheric pressure.

4. A concentrate according to claim 1, in which the ester has a molecular weight of at least 170 and a boiling point of at least 170° C. at atmospheric pressure.

5. A liquid concentrate suitable for dispersion in an aqueous medium, useful for controlling apple storage scald, comprising a substantially homogeneous solution of from about 5% to about 70% diphenylamine and an ester having emulsifier properties, said ester being selected from the group consisting of esters of aliphatic and alicyclic mono-, di-, and trihydric alcohols esterified with an acid selected from the group consisting of mono-, di-, and tribasic aliphatic and alicyclic acids, and mono- and dibasic aromatic acids.

6. A concentrate according to claim 5 in which the ester is selected from the group consisting of esters of aliphatic mono-, di- and trihydric alcohols esterified with a monobasic aliphatic acid.

7. An aqueous dispersion of the concentrate according to claim 5, containing from about 0.02% to about 0.5% diphenylamine.

8. An aqueous dispersion of the concentrate according to claim 6, containing from about 0.02% to about 0.5% diphenylamine.

9. Method of controlling apple storage scald which comprises forming an aqueous dispersion of the concentrate of claim 1 said aqueous dispersion containing from about 0.02% to about 0.5% diphenylamine and applying said aqueous dispersion to apples.

10. Method of controlling apple storage scald which comprises forming an aqueous dispersion of the concentrate of claim 5 said aqueous dispersion containing from about 0.02% to about 0.5% diphenylamine and applying said aqueous dispersion to apples.

11. Method of controlling apple storage scald which comprises forming an aqueous dispersion of the concentrate of claim 6 said aqueous dispersion containing from about 0.02% to about 0.5% diphenylamine and applying said aqueous dispersion to apples.

12. Method according to claim 9 in which the ester has a molecular weight of at least 140 and a boiling point of at least 100° C. at atmospheric pressure.

13. Method according to claim 9 in which the ester has a molecular weight of at least 170 and a boiling point of at least 170° C. at atmospheric pressure.

References Cited

UNITED STATES PATENTS 3,034,940   5/1964   Kleiman _____ 99—154
3,376,142   4/1968   Goonewardene _____ 99—154

MAURICE W. GREENSTEIN, Primary Examiner

J. M. HUNTER, Assistant Examiner

U.S. Cl. X.R.

424—330